United States Patent
Glazemakers et al.

(10) Patent No.: US 10,715,496 B2
(45) Date of Patent: *Jul. 14, 2020

(54) CLIENT NETWORK ACCESS PROVISION BY A NETWORK TRAFFIC MANAGER

(71) Applicant: Cryptzone North America, Inc., Waltham, MA (US)

(72) Inventors: Kurt Glazemakers, Grembergen (BE); Adam Douglas Rose, Frisco, TX (US)

(73) Assignee: Cryptzone North America, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,833

(22) Filed: Aug. 27, 2018

(65) Prior Publication Data

US 2019/0014082 A1 Jan. 10, 2019

Related U.S. Application Data

(63) Continuation of application No. 15/666,227, filed on Aug. 1, 2017, now Pat. No. 10,063,521, which is a
(Continued)

(51) Int. Cl.
*H04L 29/06* (2006.01)
*H04L 12/24* (2006.01)
(Continued)

(52) U.S. Cl.
CPC ........ *H04L 63/029* (2013.01); *H04L 41/0803* (2013.01); *H04L 41/0853* (2013.01);
(Continued)

(58) Field of Classification Search
CPC .............. H04L 63/029; H04L 63/0227; H04L 63/0263; H04L 63/0272; H04L 63/0823;
(Continued)

(56) References Cited

U.S. PATENT DOCUMENTS 5,889,942 A 3/1999 Orenshteyn
6,381,631 B1 4/2002 Van Hoff
(Continued)

FOREIGN PATENT DOCUMENTS

EP 2144460 1/2010

OTHER PUBLICATIONS

European Patent Application No. 15848610.0, extended European search report, dated Sep. 5, 2017.
(Continued)

*Primary Examiner* — Michael S McNally
(74) *Attorney, Agent, or Firm* — Greenberg Traurig (57) ABSTRACT

In one embodiment, a computer implemented method provides a client computing device network access to a private network by a network traffic manager, and the method includes: obtaining context parameters related to a context of the client computing device; selecting as a function of the context parameters one or more policies as selected policies, wherein each policy is associated with one or more network entitlement rules defining network access rules to a networking device or an application in the private network according to the policy; retrieving the one or more network entitlement rules associated with the selected policies; and providing the network traffic manager with the one or more network entitlement rules, thereby providing the client computing device the network access.

20 Claims, 6 Drawing Sheets

Related U.S. Application Data continuation of application No. 15/260,881, filed on Sep. 9, 2016, now Pat. No. 9,736,120.

(60) Provisional application No. 62/242,942, filed on Oct. 16, 2015.

(51) Int. Cl.
*H04L 12/813* (2013.01)
*H04L 29/08* (2006.01)

(52) U.S. Cl.
CPC ............ *H04L 41/28* (2013.01); *H04L 47/20* (2013.01); *H04L 63/0227* (2013.01); *H04L 63/0263* (2013.01); *H04L 63/0272* (2013.01); *H04L 63/0823* (2013.01); *H04L 63/20* (2013.01); *H04L 67/14* (2013.01); *H04L 63/102* (2013.01)

(58) Field of Classification Search
CPC ... H04L 63/20; H04L 63/102; H04L 41/0803; H04L 41/0853; H04L 47/20; H04L 67/14
USPC ............................................................ 726/1
See application file for complete search history.

(56) References Cited

U.S. PATENT DOCUMENTS

| | | |
|---|---|---|
| 6,766,454 B1 | 7/2004 | Riggins |
| 6,898,710 B1 | 5/2005 | Aull |
| 7,359,974 B1 | 4/2008 | Quinn et al. |
| 7,444,518 B1 | 10/2008 | Dharmarajan et al. |
| 7,661,131 B1 | 2/2010 | Shaw et al. |
| 7,665,130 B2 | 2/2010 | Johnston et al. |
| 7,809,003 B2 | 10/2010 | Makela |
| 7,904,952 B2 | 3/2011 | Yeap et al. |
| 7,954,144 B1 | 5/2011 | Ebrahimi et al. |
| 8,001,610 B1 | 8/2011 | Chickering et al. |
| 8,353,021 B1 | 1/2013 | Satish et al. |
| 8,429,232 B1 | 4/2013 | Appenzeller et al. |
| 8,819,763 B1 | 8/2014 | Cheung et al. |
| 9,148,408 B1 | 9/2015 | Glazemakers et al. |
| 9,432,333 B2 | 8/2016 | Dhaene |
| 9,485,279 B2 | 11/2016 | Kimer et al. |
| 9,509,574 B2 | 11/2016 | Kimer et al. |
| 9,553,768 B2 | 1/2017 | Scott et al. |
| 9,736,120 B2 | 8/2017 | Glazemakers et al. |
| 9,853,947 B2 | 12/2017 | Glazemakers et al. |
| 10,063,521 B2 | 8/2018 | Glazemakers et al. |
| 2002/0026503 A1 | 2/2002 | Bendinelli et al. |
| 2002/0049914 A1 | 4/2002 | Inoue et al. |
| 2002/0093915 A1 | 7/2002 | Larson |
| 2003/0028805 A1 | 2/2003 | Lahteenmaki |
| 2003/0041136 A1 | 2/2003 | Cheline et al. |
| 2003/0055994 A1 | 3/2003 | Herrmann et al. |
| 2003/0131263 A1 | 7/2003 | Keane et al. |
| 2003/0200321 A1 | 10/2003 | Chen et al. |
| 2003/0237004 A1 | 12/2003 | Okamura |
| 2004/0044910 A1 | 3/2004 | Ylipieti |
| 2004/0073666 A1 | 4/2004 | Foster et al. |
| 2004/0078573 A1 | 4/2004 | Matsuyama |
| 2004/0088542 A1 | 5/2004 | Daude et al. |
| 2004/0167984 A1 | 8/2004 | Herrmann |
| 2005/0246767 A1 | 11/2005 | Fazal et al. |
| 2005/0273850 A1 | 12/2005 | Freund |
| 2005/0273853 A1 | 12/2005 | Oba et al. |
| 2006/0053296 A1 | 3/2006 | Busboom et al. |
| 2006/0143702 A1 | 6/2006 | Hisada et al. |
| 2006/0190987 A1 | 8/2006 | Ohta et al. |
| 2007/0074049 A1 | 3/2007 | Frenkel et al. |
| 2007/0101405 A1 | 5/2007 | Engle et al. |
| 2007/0209081 A1 | 9/2007 | Morris |
| 2007/0299954 A1 | 12/2007 | Fatula |
| 2008/0028436 A1 | 1/2008 | Hannel et al. |
| 2008/0046995 A1 | 2/2008 | Satterlee et al. |
| 2008/0052775 A1 | 2/2008 | Sandhu et al. |
| 2008/0082640 A1 | 4/2008 | Chang et al. |
| 2008/0178278 A1 | 7/2008 | Grinstein et al. |
| 2008/0301801 A1 | 12/2008 | Jothimani |
| 2009/0113540 A1 | 4/2009 | Chandwani |
| 2009/0119749 A1 | 5/2009 | Datla et al. |
| 2009/0249440 A1 | 10/2009 | Platt et al. |
| 2010/0175124 A1 | 7/2010 | Miranda |
| 2010/0205657 A1 | 8/2010 | Manring et al. |
| 2010/0306530 A1 | 12/2010 | Johnson et al. |
| 2011/0016509 A1 | 1/2011 | Huang et al. |
| 2011/0107411 A1 | 5/2011 | McClain et al. |
| 2011/0307947 A1 | 12/2011 | Kariv et al. |
| 2012/0210002 A1 | 8/2012 | McQuade |
| 2013/0133027 A1 | 5/2013 | Chickering et al. |
| 2013/0205366 A1 | 8/2013 | Luna et al. |
| 2013/0247142 A1 | 9/2013 | Nishizawa et al. |
| 2014/0052838 A1* | 2/2014 | Giacomoni ............ H04L 41/00 709/223 |
| 2014/0109175 A1 | 4/2014 | Barton et al. |
| 2014/0223541 A1 | 8/2014 | Yoon et al. |
| 2014/0282914 A1 | 9/2014 | Holmelin et al. |
| 2015/0244711 A1 | 8/2015 | Venkataraman et al. |
| 2016/0099916 A1 | 4/2016 | Glazemakers et al. |
| 2017/0111317 A1 | 4/2017 | Glazemakers et al. |
| 2017/0359307 A1 | 12/2017 | Glazemakers et al. |
| 2018/0139177 A1 | 5/2018 | Glazemakers et al. |

OTHER PUBLICATIONS

AppGate 10.2.3 manual, 2004.
International Patent Application PCT/US2015/050485 International Search Report and Written Opinion, dated Jan. 12, 2016.

\* cited by examiner

Fig. 5C ized Network ACCESS PROVISION
BY A NETWORK TRAFFIC MANAGER

RELATED APPLICATIONS

This application is a continuation application of U.S. patent application Ser. No. 15/666,227, filed Aug. 1, 2017, entitled "CLIENT NETWORK ACCESS PROVISION BY A NETWORK TRAFFIC MANAGER," which is a continuation application of U.S. patent application Ser. No. 15/260,881, filed Sep. 9, 2016, issued as U.S. Pat. No. 9,736,120 on Aug. 15, 2017, and entitled "CLIENT NETWORK ACCESS PROVISION BY A NETWORK TRAFFIC MANAGER," which claims priority to U.S. Provisional Application Ser. No. 62/242,942, filed Oct. 16, 2015, entitled "CLIENT NETWORK ACCESS PROVISION BY A NETWORK MANAGER," by Glazemakers et al., the entire contents of which applications are incorporated by reference as if fully set forth herein.

FIELD

The present disclosure generally relates to the field of network access control, and more particularly to the restriction of client access to a private network by a network traffic manager such as for example a firewall or an application proxy.

In particular, the disclosure relates to the protection of networking devices or applications on the networking level, i.e., by allowing only authorized or trusted clients to have network access to a certain networking device or application.

BACKGROUND

Organizations or companies typically use a private communication network or intranet. A plurality of services or applications are then provided within the private network to client computing devices that are also connected to the private network. A connection to the private network may be direct by physically connecting the client to the private network or indirect by establishing a networking tunnel with the private network from outside the private network. Services or applications may for example be mail servers, file servers, Customer Relationship Management or CRM services, Enterprise Resource Planning or ERP services, document management services, etc.

Several solutions exist to prevent unauthorized access to such networking devices or applications. For example, firewalls and proxies can regulate and monitor what kind of traffic and how the traffic can traverse the network boundaries of the private network, thereby separating a public network such as a Wide Area Network from the private network. Network traffic managers such as for example firewalls or proxies may also be implemented within the private network to manage network traffic within the private network itself.

Published application no. US 2012/0180120 discloses a method and a system for restricting access to a private network that allows for a context-based access of network resources by network users. The network resource may be an application, website, program, communication means, etc., available by accessing the private network. A request is sent to a network firewall to access a web application, where the web application is identified. A context template is created for the web application, and compared with the request to create a request context map. The request context map is compared to a request context rule on the network firewall. Access is provided to the web application when the request context map matches the request context rule.

Published application no. US 2012/0180120 thus discloses to retrieve the context of the user or client computing device from the incoming packets themselves and then decides whether to block the incoming packet or not based on this context. A problem with this is that the firewall rules are dynamically generated based on the content of the packet, i.e., by deep packet inspection. Because of this, a lot of processing power is needed per handled packet. This may be particularly problematic when a large number of incoming packets must be handled. Furthermore, a large delay exists between the capture of the incoming packet and the moment that the decision for allowing or blocking it is taken.

SUMMARY

Systems and methods to provide network access by a client computing device to a private network using network traffic manager are described herein. Some embodiments are summarized in this section.

In a first embodiment, a method overcomes the above identified shortcomings of existing solutions. More particularly, the method securely provides access to a private network by a network traffic controller such as for example a firewall or an application proxy in a simple and efficient manner.

According to the first embodiment, a computer-implemented method provides a client computing device network access to a private network by a network traffic manager, the method comprising: obtaining context parameters related to a context of the client computing device; selecting as a function of the context parameters one or more policies as selected policies, wherein each policy is associated with one or more network entitlement rules defining network access rules to a networking device or an application in the private network according to the policy; retrieving the one or more network entitlement rules associated with the selected policies; and providing the network traffic manager with one or more network entitlement rules, thereby providing the client computing device the network access.

In this first embodiment, the method ensures the security of a private network by efficiently and reliably discriminating client computing devices based on the respective context of each client computing device when providing network access to networking devices or applications in the private network. A context of the client computing device is taken into account when selecting a policy associated with one or more network entitlement rules defining network access rules for the client computing device to a networking device or application in the private network. This way, network access to the private network is granted to a client computing device when its context matches a policy associated with network entitlement rules providing network access to the private network. In other words, the client computing device is only granted network access to a networking device or an application of the private network if the network entitlement rules associated with one or more policies selected from its context parameters allow it.

The network entitlement rules associated with the selected policies also define the extent of the network access for the client computing device. This improves the security of the private network while making the method flexible and adaptable to any client computing devices willing to be provided network access to the private network.

Additionally, there is no need for deep packet inspection to determine if the client computing device may be granted network access. On the contrary, after the retrieving step, a complete set of static network entitlement rules are obtained applicable for the given context. Then, when the network traffic manager is in use, the static network entitlement rules only need to be applied without further derivation of a context as the context is implicitly present by the specific selection of the appropriate network entitlement rules. The method according to this first embodiment is therefore simple and efficient when a large number, such as for example hundreds, thousands, etc., of client computing devices request network access to the private network.

In one embodiment, the selected policies of the client computing device are selected from a list of predetermined policies based upon context parameters related to a context of the client computing device. One or more policies correspond to each client computing device, depending on the context parameters related to a context of the client computing device. The policies divide the network entitlement rules into groups. The policies can be defined before a client computing device is willing to be provided with network access to the private network. The combination of one or more policies provides flexibility in providing network access to client computing devices.

A networking device may for example be a networking device providing a service in the private network. The networking device can receive networking packets addressed to it and reply to them in order to fulfil this service. Such a networking device may be an application server such as for example but not limited to a mail server providing mail service, a file server providing networked data storage or a web server providing hosting services. A networking device may also be networking equipment such as for example routers or switches where the administrator access is then the service provided. All network access may further be accomplished according to the IP of Internet Protocol. Client computing devices may thus be completely separated from the service providing networking devices, and have, by default, no access to them.

In various embodiments, a network traffic manager is for example a firewall or an application proxy. Network entitlement rules define which client computing device and which user of a client computing device are allowed to do what once they are granted network access to the private network. In other words, network entitlement rules define which client computing device and which user of a client computing device have access to which networking devices or applications of the private network once they are granted network access to the private network. Network entitlement rules are usually defined for each networking device and application of the private network. The network entitlement rules as defined herein therefore strengthen the security of networking devices and applications of the private network, for example Web services, Web applications, legacy applications, documents and files, and physical security systems, by providing a more granular security that is more specific to client computing devices. With centralized policies, the moment a policy is entered/updated, all applications automatically receive the benefit of the new/updated network entitlement rules.

According to an alternative embodiment, the selecting step comprises performing a predefined logical combination of the context parameters.

Security groups based on device, user and/or system parameters or any combination of those can be defined. This allows the defining of fine-grained network entitlement rules, but also acts as a multiplier on the amount of network entitlement rules.

According to an alternative embodiment, the selecting step comprises performing a predefined Boolean combination of the context parameters.

The selecting step of the method may comprise performing a predefined combination of two or more of a device parameter, a user parameter and a system parameter. For example, the selecting step of the method according to the present disclosure may comprise performing a predefined Boolean combination of two or more of a device parameter, a user parameter and a system parameter. For example, context parameters comprise a combination of a device parameter, a user parameter and a system parameter according to the basic operation AND. Alternatively, context parameters may comprise a combination of a device parameter, a user parameter and a system parameter according to any basic operation, such as for example AND, OR, NOT, and combinations of basic operations, or according to any derived operation, such as material implication, exclusive or, equivalence, and combinations of derived operations. Alternatively, context parameters may comprise any combination of basic operations and derived operations of a device parameter, a user parameter and a system parameter. Alternatively, the context parameters can be manually inputted, stored and retrieved from a database of the networking device or of the private network.

According to an alternative embodiment, the context parameters comprise at least one of the group of: a device parameter indicative for a state or property of the client computing device; a user parameter indicative for a property of a user of the client computing device; and a system parameter indicative for a property of a framework configuration of the client computing device.

This way, a context of the client computing device is taken into account when selecting a policy associated with one or more network entitlement rules defining network access rules for the client computing device to a networking device or application in the private network. This way, network access to the private network is granted to a client computing device when its context matches a policy associated with network entitlement rules providing network access to the private network. This improves and guarantees the security of the private network while providing flexibility and adaptability to the grant of network access.

According to an alternative embodiment, the device parameter comprises at least one of the group of a network address of the client computing device, a certificate of the client computing device, local firewall configuration information, and information related to a networking interface configuration of the client computing device.

This way, client computer devices may be discriminated from each other. For example, if a device parameter indicates that a client computing device does not comprise local firewall configuration information, or does not demonstrate a latest update of this local firewall configuration, it may fall under a different policy. This is an indication that the client computing device does not enjoy protection of a firewall, or does not enjoy the optimal protection possible or was not lately submitted to a scan. This device parameter will be taken into account when selecting policies, and the resulting associated network entitlement rules will determine network access to the private network for this client computing device, thereby ensuring the security and the integrity of the private network by refusing network access to client computing devices with device parameters which do not comply with the security requirements of the private network.

According to an embodiment, the user parameter comprises at least one of the group of user account information for the user in the private network, information on a country the user is registered in, and e-mail account information of the user.

This way, users of a single client computer device may be discriminated from each other. For example, a user parameter indicates a country in which the user is registered, or an e-mail account of the user. This user parameter will be taken into account when selecting policies for the client computing device, and the resulting associated network entitlement rules will determine network access to the private network for this client computing device and this user, thereby ensuring the security and the integrity of the private network by refusing network access to the client computing device if the user of the client computing device does not comply with the security requirements of the private network.

In one embodiment, the system parameter comprises at least one of the group of a time of the day, a login history of the client computing device, and a login history of the user of the client computing device.

This way, client computer devices may be discriminated from each other based on a framework configuration of the client computing device. For example, a system parameter indicates that a client computing device has never logged in the private network at this moment of the day. This could be an indication of an unusual behaviour and activity of the client computing device. This system parameter will be taken into account when selecting policies, and the resulting associated network entitlement rules will determine network access to the private network for this client computing device, thereby ensuring the security and the integrity of the private network by refusing network access to client computing devices with system parameters which do not comply with the security requirements of the private network.

In one embodiment, the one or more network entitlement rules are generic for any client computing device, and the retrieving step further comprises assigning a networking address of the client computing device to the one or more network entitlement rules.

The stored network entitlement rules are thus not yet applicable to a specific client device but generic. It is only when the method is applied for a specific client device that requests access and when the selected network entitlement rules are retrieved that the addressing information of the client device is added to the network entitlement rules. This allows a memory efficient storage of the policies and associated network entitlement rules while keeping great flexibility.

According to an embodiment, the method further comprises the step of creating a predetermined set of policies, and the selecting step comprises selecting the selected policies from the predetermined set of policies.

This way, time is saved by predetermining policies before a client computing device requests network access to the private network. Predetermined policies are for example programmed and stored in a database and retrieved when a client computing device requests network access to the private network.

According to a second embodiment of the disclosure, there is provided a computer program product comprising computer-executable instructions for performing the method according to the first embodiment when the program is run on a computer.

According to a third embodiment of the disclosure, there is provided a computer readable storage medium comprising the computer program according to the second embodiment.

According to a fourth embodiment of the disclosure, there is provided a networking device for providing a client computing device network access to a private network by a network traffic manager, the device comprising: a context parameters receiving unit, adapted to receive context parameters related to a context of the client computing device; a policy selecting engine, configured to selecting from the context parameters one or more policies as selected policies, wherein each policy is associated with one or more network entitlement rules defining network access rules to a networking device or an application in the private network according to the policy; a network entitlement rules retrieving module, adapted to retrieve the one or more network entitlement rules associated with the selected policies; and a network access providing unit, adapted to provide the one or more network entitlement rules to the network traffic manager, thereby providing the client computing device the network access.

According to a fifth embodiment of the disclosure, there is provided a system comprising: a networking device according to a fourth embodiment of the disclosure; and wherein the networking device is further configured to provide the one or more network entitlement rules to the client computing device upon authentication of the client computing device with the networking device; and a gateway for providing network access to the access network comprising: a tunnel module for establishing a networking tunnel between the gateway and the client computing device; a network traffic manager configuration module for receiving the one or more network entitlement rules from the client computing device; and the network traffic manager for allowing the network access according to the one or more network entitlement rules.

When the client computing device establishes a tunnel with the gateway, it has access to the private network, but is still denied access from the networking devices on the private network as long as it does not provide the one or more network entitlement rules to the gateway. When the one or more network entitlement rules are provided to the gateway, the client computing device has only network access to the networking devices or application according to the network entitlement rules. This network separation between clients and service providing networking devices is safer than application level protection schemes as the client cannot inspect or look for vulnerabilities in devices that it does not have network access to. The system further allows centralized network access control, i.e. all access is controlled from the gateway making configuration simple and straightforward. The network entitlement rules further allow the client computing device to know which services it has access to. The client computing device is thus not confronted with unexpected service failure because it knows which services it is authorized to access.

According to an embodiment, the networking device further comprises a tunnel session list engine for providing a client tunnel session list comprising tunnel authentication information to the client computing device; and the tunnel module establishes the tunnel upon authentication of the client computing device using the tunnel authentication information. This adds further security to the system as an unauthenticated client computing device will not even be allowed to establish the tunnel or will not even find the gateway.

According to a further embodiment, the one or more network entitlement rules are not alterable by the client computing device.

According to an embodiment, the one or more network entitlement rules are readable by the client computing device. This way, the client computing device can identify the selection of networking devices or applications it may have network access to. The client computing device can therefore easily verify the accessible devices and inform a user promptly. Alternatively, the network entitlement rules are partially or fully not readable by the client computing device, for example in a private network where the network entitlement rules should not be communicated to one or more client computing devices to guarantee the security of the private network.

The disclosure includes methods and apparatuses which perform these various embodiments, including computer processing systems which perform these methods, and computer readable media containing instructions which when executed on computer processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
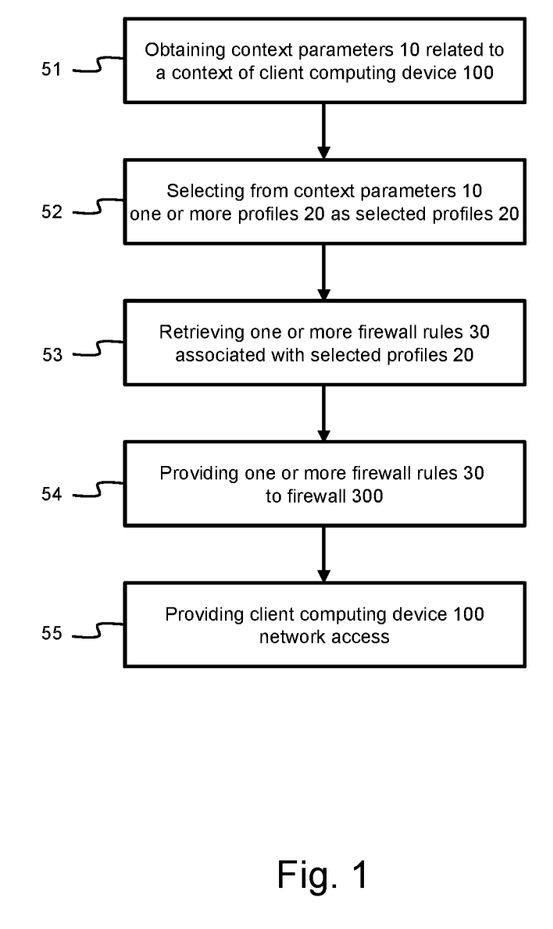
FIG. 1 schematically illustrates the steps of an embodiment of the method according to the present disclosure.

As illustrated in FIG. 1, at least one embodiment of the disclosure is a method that provides a client computing device 100 network access to a private network 200 by a network traffic manager 300. The method starts with step 51 and comprises various steps as discussed below. In step 51, the method obtains context parameters 10 related to a context of the client computing device 100. The method further comprises in step 52 selecting from the context parameters 10 one or more policies as selected policies 20, wherein each policy 20 is associated with one or more network entitlement rules 30 defining network access rules to a networking device 201 or an application 202 in the private network 200 according to the policy 20. The method further comprises in step 53 retrieving one or more network entitlement rules 30 associated with the selected policies 20. The method further comprises in step 54 providing one or more network entitlement rules to the network traffic manager 300. In step 55, the client computing device 100 is provided network access.

Figure 2:
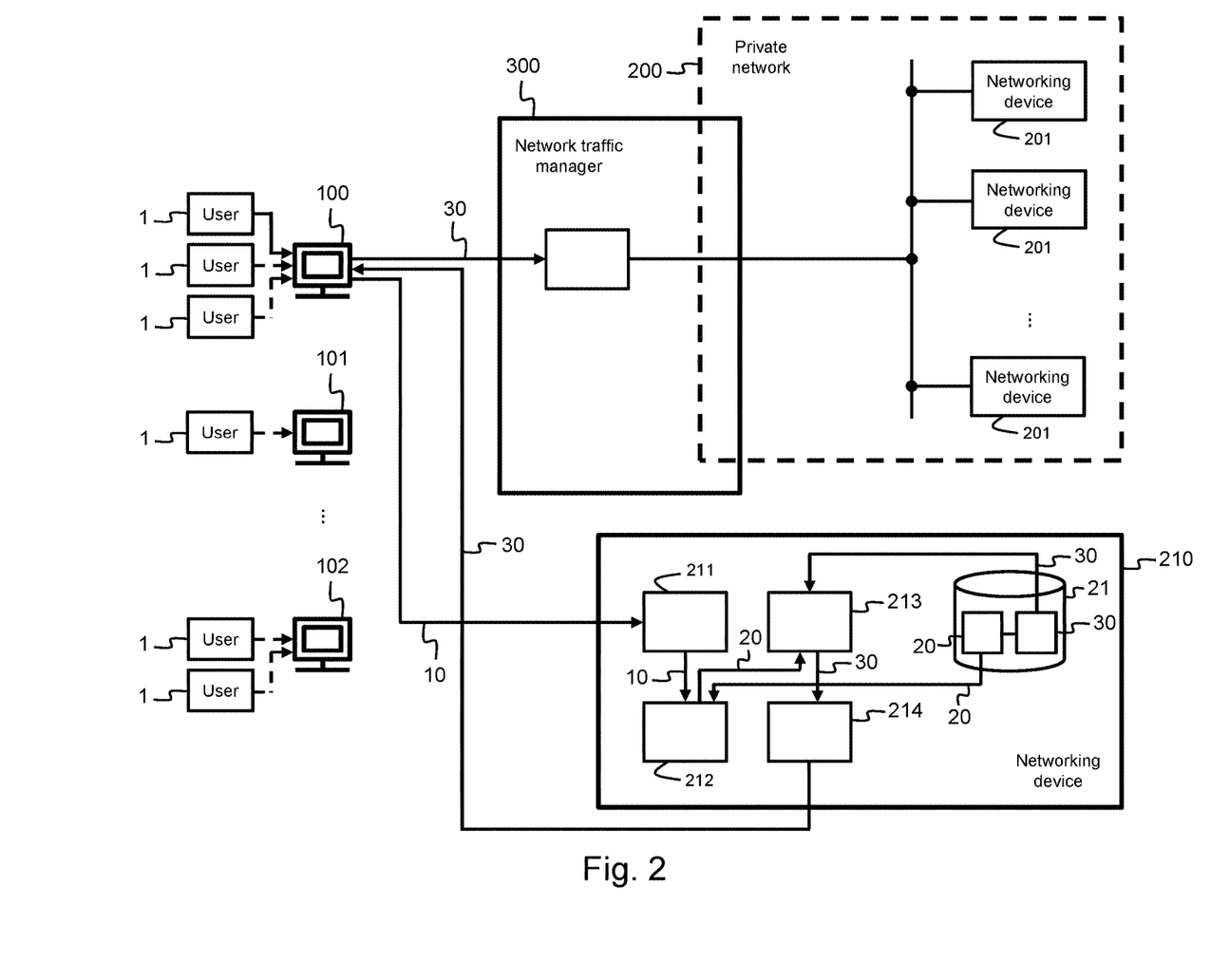
FIG. 2 schematically illustrates an embodiment of the networking device according to the present disclosure.

According to an embodiment shown in FIG. 2, a networking device 210 provides a client computing device 100 network access to a private network 200 by a network traffic manager 300. The network traffic manager 300 is for example a firewall or an application proxy. Three client computing devices 100, 101, 102 are depicted in FIG. 2, and the client computing device 100 is willing to obtain network access to the private network 200. The client computing device 100 comprises three users 1, the client computing device 101 comprises one user 1 and the client computing device 103 comprises two users 1. One of the three users 1 of the client computing device 100 is willing to obtain network access to the private network 200.

According to an alternative embodiment, there can be more than one client computing device 100 willing to obtain network access to the private network 200. According to a further alternative embodiment, each client computing device 100, 101, 102 comprises more than one user 1 willing to obtain network access to the private network 200. Client computing devices 100, 101, 102 are completely separated from the service providing networking devices 201 or applications 202 of the private network 200, and have, by default, no access to them. The private network 200 comprises a network of networking devices 201 or applications, for example two, three, four, tens, hundreds, etc., of networking devices 201 or applications. A networking device 201 in this embodiment is to be understood as a networking device 201 providing a service in the private network 200. The networking device 201 can receive networking packets addressed to it and reply to them in order to fulfil this service. Such a networking device 201 may be an application server such as for example but not limited to a mail server providing mail service, a file server providing networked data storage or a web server providing hosting services. A networking device 201 may also be networking equipment such as for example routers or switches where the administrator access is then the service provided. All network access may further be accomplished according to the IP of Internet Protocol.

In this embodiment, networking device 210 comprises a context parameters receiving unit 211, a policy selecting engine 212, a network entitlement rules retrieving module 213, and a network access providing unit 214. The context parameters receiving unit 211 is adapted to receive context parameters 10 from the client computing device 100 related to a context of the client computing device 100. The context parameters 10 comprise at least one of the group of a device parameter indicative for a state or property of the client computing device 100, a user parameter indicative for a property of a user 1 of the client computing device 100, and a system parameter indicative for a property of a framework configuration of the client computing device 100.

The policy selecting engine 212 is configured to select from the context parameters 10 it receives from the context parameters receiving unit 211 one or more policies 20. The one or more policies 20 are referred to as selected policies 20. The policy selecting engine 212 of the networking device 210 is adapted to perform a predefined Boolean combination of the context parameters 10 of the client computing device 100 to select one or more policies 20. Each policy 20 is associated with one or more network entitlement rules 30 that define network access rules to a networking device 201 or an application 202 in the private network 200 according to the policy 20.

The network entitlement rules retrieving module 213 is adapted to retrieve one or more network entitlement rules 30 associated with the selected policies 20. The network access providing unit 214 is adapted to provide one or more network entitlement rules 30 associated with the selected policies 20 to the client computing device 100 upon authentication of the client computing device 100 with the networking device 210, and the client computing device 100 provides the network entitlement rules 30 to the network traffic manager 300, thereby providing the client computing device 100 the network access.

According to an alternative embodiment, the client computing device 100 provides a subset of the network entitlement rules 30 to the network traffic manager 300. The networking device 210 further comprises a database comprising a predetermined set of policies 21. The predetermined set of policies 21 comprises the policies 20, each policy 20 being associated with one or more network entitlement rules 30. The policy selecting engine 212 selects the selected policies 20. The selected policies 20 are communicated to the network entitlement rules retrieving module 213 which retrieves one or more network entitlement rules 30 associated with the selected policies 20.

The one or more selected policies 20 of the client computing device 100 may for example be related to the fact that the client computing device 100 is known from the private network 200 for having previously accessed the private network 200, or that the client computing network 200 is external to the company and has never accessed the private network 200 before. The one or more selected policies 20 of the client computing device 100 may further for example correspond to a department of a company to which the client computing device 100 belongs, such as the human resources department, or the research and development department, or the sales department, or the IT department, etc. This way, a client computing device 100 of a company may for example be associated with a policy 20 of a device that already accessed the private network 200 and with a policy 20 of a device that belongs to the sales department. Network access of the client computing device 100 will be determined depending on the one or more network entitlement rules 30 associated with each policy 20. For example, a policy 20 corresponding to a client computing device 100 forming part of the IT department might for example be granted network access and administrator rights on the accessed networking devices 201, while a policy 20 corresponding to a client computing device 100 forming part of the sales department would be granted network access and user rights on the accessed networking devices 201.

Alternatively, a client computing device 100 of a company may for example be associated with a policy 20 of a device that never accessed the private network 200 before and a policy 20 of a member of the company having correctly logged in his username and his password to access the private network 200. This might for example be the case when the member of the company requests network access with his personal laptop. In this example, network access rules defined by the one or more network entitlement rules 30 associated with the one or more policies 20 will determine the network access of the personal laptop. The private network 200 is therefore protected from the intrusion of untrusted client computing devices 100.

A system parameter 13 of a client computing device 100 may for example indicate that the client computing device 100 has never logged in the private network 200 at this moment of the day ever before. In one embodiment, collected parameters 13 are provided by the network traffic manager itself. Examples of parameters include: from which IP is the client coming (this is typically different than the IP seen on the device itself due to NAT, for example), how did the user authenticate (e.g., login and password, or two-factor), etc. These kinds of parameters are collected by the network traffic manager 300, or can be collected at networking device 210 (or system 400).

A device parameter 11 of the client computing device 100 may then for example indicate a network address of the client computing device 100 that does not correspond to the network address from which this client computing device 100 usually requests network access to the private network 200. In one embodiment, these parameters are collected from the client computing device 100 itself. This can be done, for example, by writing a script (or using a default built-in script) to obtain typical device parameters like, for example, OS, IP-address, AV turned on, etc.

A user parameter 12 of the client computing device 100 may however for example indicate a group of user account information for a user 1 in the private network 200, correct information on a country the user 1 is registered in, and correct e-mail account information of the user 1. In one embodiment, collecting parameters 12 is regarding the user and which context he or she is in, such as, for example, like-group memberships, which office or country he/she belongs to, etc. In one embodiment, parameters 12 are collected at an identity service (not shown).

Context parameters 10 of the client computing device 100 comprise a logical and predefined combination of at least one of the group of, for example, the system parameter 13 and the device parameter 11 and the user parameter 12. In this example, a known and trusted user 1 of the private network 100 may request access to the private network 200 from a different client computing device 100 that never requested network access before, such as his personal laptop. One or more policies 20 are selected as a function of these context parameters 10 and the network entitlement rules 30 associated with the selected policies 20 will define the network access rules for the client computing device 100.

In some embodiments, network traffic manager 300 and/or networking device 210 are each implemented using a computing device comprising one or more processors and one or more memories. Also, the computing device may include one or more databases to store the main policies and the network entitlements, and further store logic that collects the different parameters, as discussed herein. These parameters are then evaluated against the policies to filter out the proper network entitlements.

Figure 3:
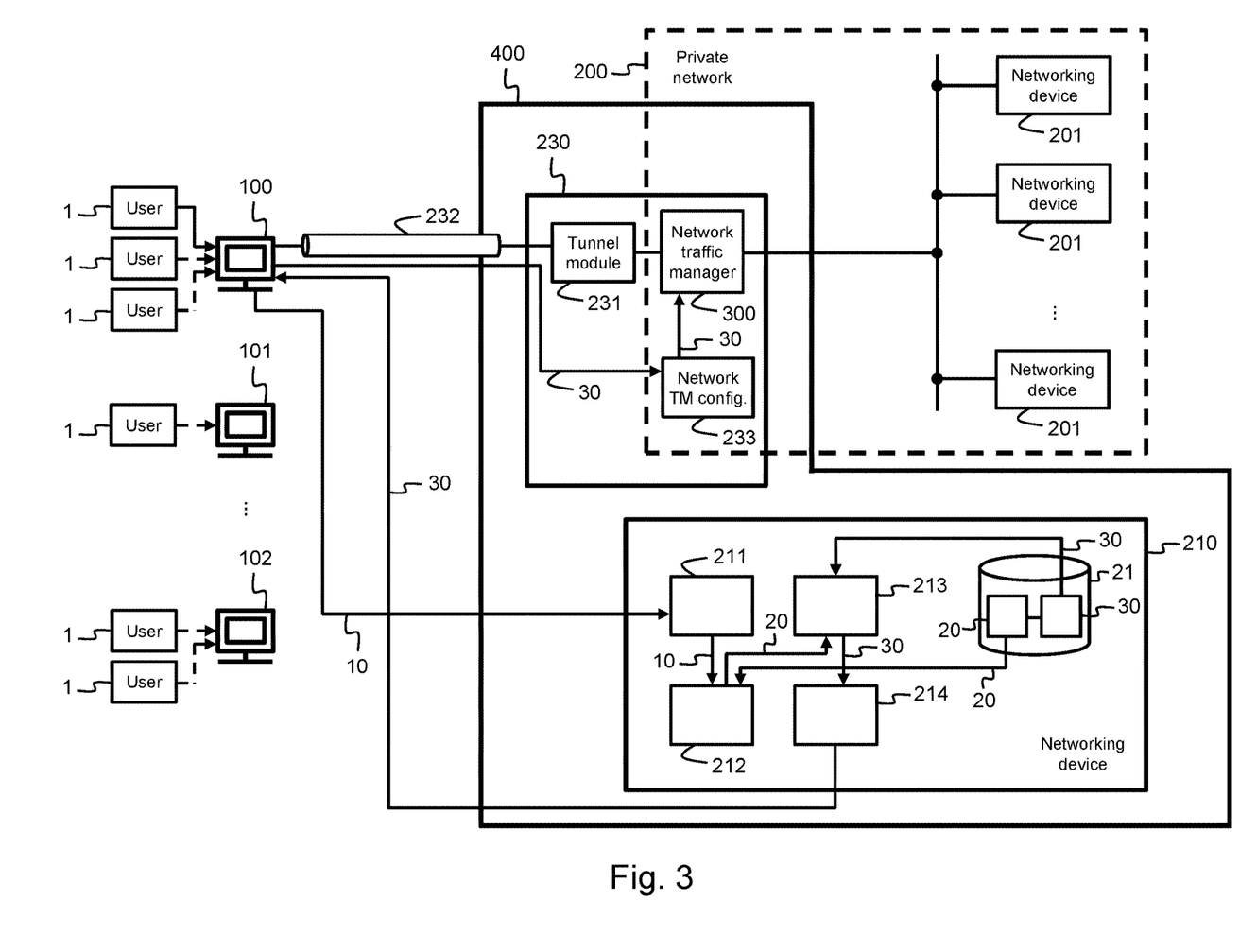
FIG. 3 schematically illustrates an embodiment of the system according to the present disclosure.

According to an embodiment shown in FIG. 3, a networking device 210 provides a client computing device 100 network access to a private network 200 by a network traffic manager 300. Components having identical reference numbers to components in FIG. 2 perform the same function. The network traffic manager 300 is for example a firewall or an application proxy. Three client computing devices 100, 101, 102 are depicted in FIG. 3, and the client computing device 100 is willing to obtain network access to the private network 200. One of the three users 1 of the client computing device 100 is willing to obtain network access to the private network 200. Client computing devices 100, 101, 102 are completely separated from the service providing networking devices 201 or applications 202 of the private network 200, and have, by default, no access to them. The private network 200 comprises a network of networking devices 201 or applications, for example two, three, four, tens, hundreds, etc., of networking devices 201 or applications.

A system 400 comprises the networking device 210 and a gateway 230. According to an alternative embodiment, the gateway 230 comprises the networking device 210. The networking device 210 comprises a context parameters receiving unit 211, a policy selecting engine 212, a network entitlement rules retrieving module 213, and a network access providing unit 214. The context parameters 10 comprise at least one of the group of a device parameter indicative for a state or property of the client computing device 100, a user parameter indicative for a property of a user 1 of the client computing device 100, and a system parameter indicative for a property of a framework configuration of the client computing device 100. The networking device 210 is further configured to provide one or more network entitlement rules 30 to the client computing device 100 upon authentication of the client computing device 100 with the networking device 210.

According to an alternative embodiment, the client computing device 100 provides a subset of the network entitlement rules 30 to the network traffic manager 300. The gateway 230 comprises a tunnel module 231 for establishing a networking tunnel 232 between the gateway 230 and the client computing device 100. The gateway 230 further comprises a network traffic manager configuration module 233, labelled "Network TM config." in FIG. 3, for receiving one or more network entitlement rules 30 from the client computing device 100. Additionally, the gateway 230 comprises the network traffic manager 300 for allowing network access to the client computing device 100 to the private network 200 according to one or more network entitlement rules 30 associated with the selected policies 20. The network entitlement rules 30 are not alterable for the client computing device 100. The network entitlement rules 30 are readable by the client computing device 100.

According to an alternative embodiment, the network entitlement rules 30 are not readable by the client computing device 100. According to a further alternative embodiment, the private network 200 comprises the networking device 210. The networking device 210 may communicate directly with the gateway 230, for example when a client computing device 100 must have its network access to the private network 200 revoked.

In various embodiments, system 400 and/or gateway 230 may each be implemented using a computing device comprising one or more processors and one or more memories (e.g., a memory as described below).

Figure 4:
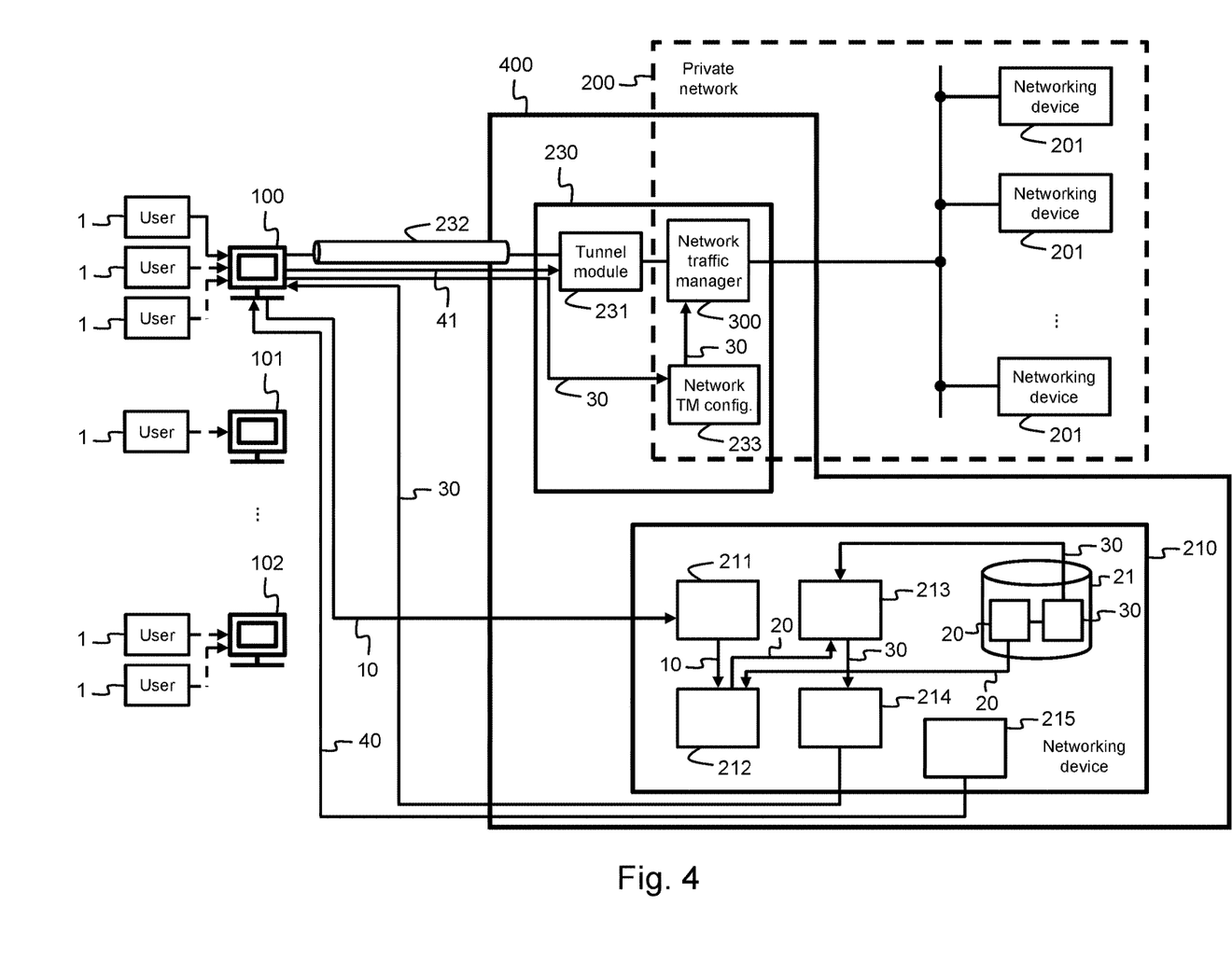
FIG. 4 schematically illustrates an embodiment of the system according to the present disclosure, wherein the networking device further comprises a tunnel list engine.

According to an embodiment shown in FIG. 4, a networking device 210 provides a client computing device 100 network access to a private network 200 by a network traffic manager 300. Components having identical reference numbers to components in FIG. 3 perform the same function. The network traffic manager 300 is for example a firewall or an application proxy. Three client computing devices 100, 101, 102 are depicted in FIG. 4, and the client computing device 100 is willing to obtain network access to the private network 200. One of the three users 1 of the client computing device 100 is willing to obtain network access to the private network 200. Client computing devices 100, 101, 102 are completely separated from the service providing networking devices 201 or applications 202 of the private network 200, and have, by default, no access to them. The private network 200 comprises a network of networking devices 201 or applications, for example two, three, four, tens, hundreds, etc., of networking devices 201 or applications.

A system 400 comprises the networking device 210 and a gateway 230. The networking device 210 comprises a context parameters receiving unit 211, a policy selecting engine 212, a network entitlement rules retrieving module 213, and a network access providing unit 214. The context parameters 10 comprise at least one of the group of a device parameter indicative for a state or property of the client computing device 100, a user parameter indicative for a property of a user 1 of the client computing device 100, and a system parameter indicative for a property of a framework configuration of the client computing device 100. The networking device 210 is further configured to provide one or more network entitlement rules 30 to the client computing device 100 upon authentication of the client computing device 100 with the networking device 210.

According to an alternative embodiment, the client computing device 100 provides a subset of the network entitlement rules 30 to the network traffic manager 300. The gateway 230 comprises a tunnel module 231 for establishing a networking tunnel 232 between the gateway 230 and the client computing device 100. The gateway 230 further comprises a network traffic manager configuration module 233 for receiving one or more network entitlement rules from the client computing device 100. Additionally, the gateway 230 comprises the network traffic manager 300 for allowing network access to the client computing device 100 to the private network 200 according to one or more network entitlement rules 30 associated with the selected policies 20.

The networking device 210 further comprises a tunnel session list engine 215 for providing a client tunnel session list 40 comprising tunnel authentication information 41 to the client computing device 100. The tunnel module 231 of the gateway 230 then establishes the tunnel 232 upon authentication of the client computing device 100 using the tunnel authentication information 41 of the client tunnel session list 40. The network entitlement rules 30 are not alterable for the client computing device 100. The network entitlement rules 30 are readable by the client computing device 100.

According to an alternative embodiment, the network entitlement rules 30 are not readable by the client computing device 100. According to a further alternative embodiment, the private network 200 comprises the networking device 210. The networking device 210 may communicate directly with the gateway 230, for example when a client computing device 100 must have its network access to the private network 200 revoked.

Figure 5A:
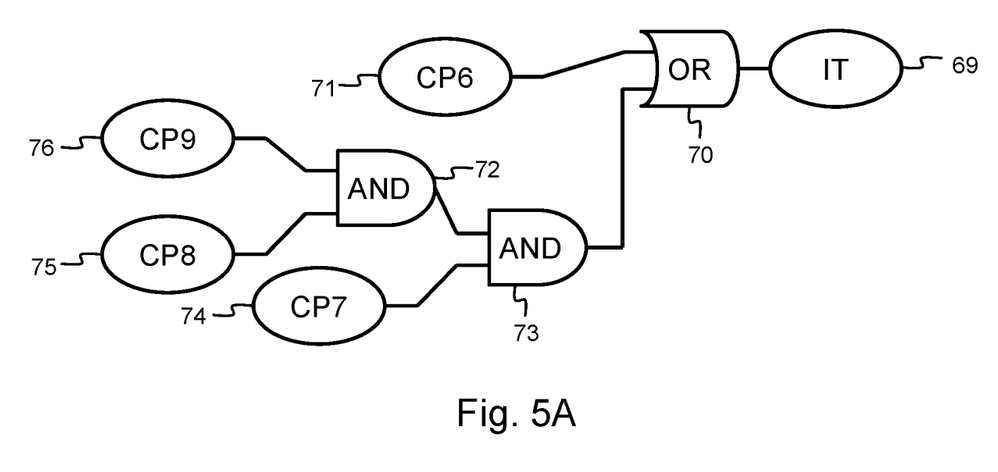
FIG. 5A-5C schematically illustrate embodiments of a predefined combination of context parameters.
Figure 5B:
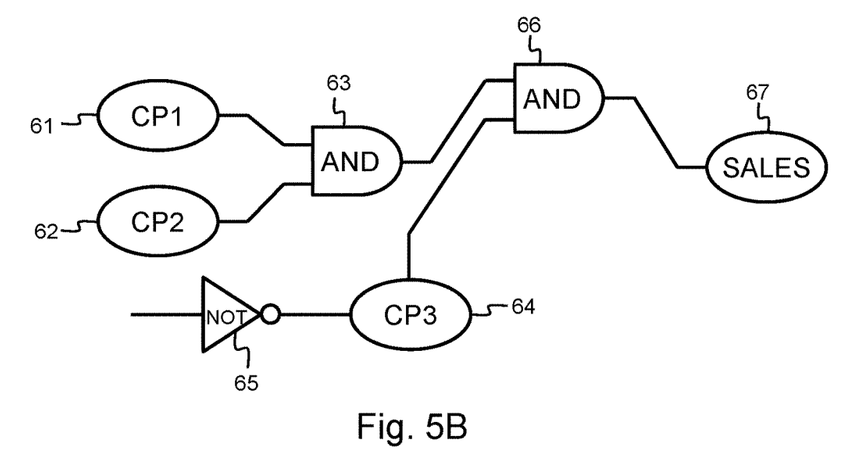
Figure 5C:
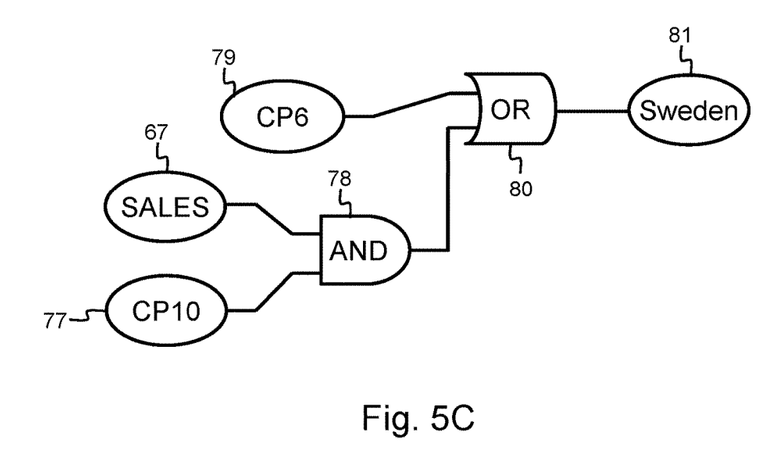

Three embodiments of a predefined combination of context parameters 10 are illustrated in FIG. 5A, FIG. 5B and FIG. 5C. The predefined combinations of context parameters 10 in FIG. 5A, FIG. 5B and FIG. 5C are predefined Boolean combinations of context parameters 10, comprising at least one of the group of a device parameter, a user parameter, and a system parameter. On FIG. 5A, a context parameter 76 labelled CP9 is combined with a context parameter 75 labelled CP8 in the AND gate 72. The output of the AND gate 72 is combined with a context parameter 74 labelled CP7 in the AND gate 73. The output of the AND gate 73 is combined with a context parameter 71 labelled CP6 in an OR gate 70. The output of the OR gate 70 is a policy 69 labelled IT, which is associated with an information technology department of a private network.

Predefined settings corresponding to the Boolean combination outputting in policy 69 must be verified upon authentication of the client computing device with the networking device in order to identify the client computing device as part of the information technology department. In other words, based on the combination of the context parameters, the policy 69 is selected, wherein the policy 69 is associated with one or more network entitlement rules defining network access rules of a client computing device registered as a member of the IT section of the private network according to the policy 69.

On FIG. 5B, a context parameter 61 labelled CP1 is combined with a context parameter 62 labelled CP2 in the AND gate 63. Using the NOT gate 65, a context parameter 64 labelled CP3 is combined with the output of the AND gate 63 in the AND gate 66. The output of the AND gate 66 is a policy 67 labelled SALES, which is which is associated with a sales department of a private network. Predefined settings corresponding to the Boolean combination outputting in policy 67 must be verified upon authentication of the client computing device with the networking device in order to identify the client computing device as part of the sales department. In other words, based on the combination of the context parameters, the policy 67 is selected, wherein the policy 67 is associated with one or more network entitlement rules defining network access rules of a client computing device registered as a member of the sales section of the private network according to the policy 67.

On FIG. 5C, the policy 67 is combined with a context parameter 77 labelled CP10 in an AND gate 78. The output of the AND gate 78 is combined in an OR gate 80 with a context parameter 79 labelled CP6. The output of the OR gate 80 is a policy 81 labelled Sweden, which is associated with a sales department of a private network located in Sweden. Predefined settings corresponding to the Boolean combination outputting in policy 81 must be verified upon authentication of the client computing device with the networking device in order to identify the client computing device as part of the sales department located in Sweden. In other words, based on the combination of the context parameters, the policy 81 is selected, wherein the policy 81 is associated with one or more network entitlement rules defining network access rules of a client computing device registered as a member of the sales section of the private network located in Sweden according to the policy 81.

Different groups of client computing devices are therefore created. For every network entitlement rule, one or more of these groups can be defined. Security groups based on device, user and/or system parameters or any combination of those can be defined. This allows the defining of fine-grained network entitlement rules, but also acts as a multiplier on the amount of network entitlement rules. For example, a policy can be defined for all the people belonging to the sales department, and for all the members of a particular project. Individual network entitlement rules can be created for every sales member and for every project member, or even a combination of both.

Although the present disclosure has been illustrated by reference to specific embodiments, it will be apparent to those skilled in the art that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the disclosure are capable of operating according to the present disclosure in other sequences, or in orientations different from the one(s) described or illustrated above.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some embodiments disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit)

component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various embodiments.

A machine readable medium can be used to store software and data which when executed by a computer processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

The invention claimed is:

1. A method comprising:
  selecting one or more policies, wherein each policy is associated with one or more network entitlement rules defining network access rules;
  retrieving the one or more network entitlement rules associated with the selected policies; and
  providing the retrieved one or more network entitlement rules to allow network access for a client computing device.

2. The method of claim 1 further comprising, obtaining context parameters related to a context of the client computing device.

3. The method of claim 2, wherein the context parameters are obtained from a network traffic manager.

4. The method of claim 3, wherein the retrieved one or more network entitlement rules are provided to the network traffic manager after authentication of the client computing device.

5. The method of claim 3, wherein the context parameters comprise at least a network address of the client computing device.

6. The method of claim 3, wherein the selecting comprises performing a predefined logical combination of the context parameters.

7. The method of claim 3, wherein the selecting comprises performing a predefined Boolean combination of the context parameters.

8. The method of claim 2, wherein the context parameters comprise at least one of:
  a device parameter indicative for a state or property of the client computing device;
  a user parameter indicative for a property of a user of the client computing device; or
  a system parameter indicative for a property of a framework configuration of the client computing device.

9. The method of claim 8, wherein the context parameters comprise at least the device parameter, and wherein the device parameter comprises at least one of: a network address of the client computing device, a certificate of the client computing device, local firewall configuration information, or information related to a networking interface configuration of the client computing device.

10. The method of claim 8, wherein the context parameters comprise at least the user parameter, and wherein the user parameter comprises at least one of: user account information for the user, information on a country in which the user is registered, or e-mail account information of the user.

11. The method of claim 8, wherein the context parameters comprise at least the system parameter, and wherein the system parameter comprises at least one of: a time of the day, a login history of the client computing device, or a login history of the user of the client computing device.

12. The method of claim 1, wherein the retrieved one or more network entitlement rules are generic for any client computing device, and the retrieving further comprises assigning a networking address of the client computing device to the retrieved one or more network entitlement rules.

13. The method of claim 1, further comprising creating a predetermined set of policies, and wherein the selecting comprises selecting the selected policies from the predetermined set of policies.

14. A networking device comprising:
at least one processor; and
at least one memory storing instructions configured to instruct the at least one processor to:
select one or more policies, wherein each policy is associated with one or more network entitlement rules;
retrieve the one or more network entitlement rules associated with the selected policies; and
provide the retrieved one or more network entitlement rules to allow network access for a client computing device.

15. The networking device of claim 14, wherein the instructions are further configured to instruct the at least one processor to obtain context parameters related to a context of the client computing device.

16. The networking device of claim 15, wherein the retrieved one or more network entitlement rules are provided to a network traffic manager after authentication of the client computing device with the networking device.

17. A system comprising:
a networking device comprising:
at least one first processor; and
at least one memory storing first instructions configured to instruct the at least one first processor to:
select one or more policies, wherein each policy is associated with one or more network entitlement rules; and
retrieve the one or more network entitlement rules associated with the selected policies;
a gateway comprising:
at least one second processor; and
at least one memory storing second instructions configured to instruct the at least one second processor to:
establish a networking tunnel between the gateway and a client computing device; and
allow network access according to the retrieved one or more network entitlement rules.

18. The system of claim 17, wherein:
the first instructions are further configured to instruct the at least one first processor to provide a client tunnel session list to the client computing device, wherein the client tunnel session list comprises tunnel authentication information; and
the second instructions are further configured to instruct the at least one second processor to establish the tunnel upon authentication of the client computing device using the tunnel authentication information.

19. The system of claim 17, wherein the instructions are further configured to instruct the at least one processor to obtain context parameters related to a context of the client computing device, wherein the context parameters comprise at least a device parameter indicative for a state or property of the client computing device.

20. The system of claim 19, wherein the context parameters further comprise a login history of the client computing device.

* * * * *